United States Patent [19]
Kröger et al.

[11] 4,205,035
[45] * May 27, 1980

[54] COAL-CONTAINING SHAPED BODIES AND PROCESS FOR MAKING THE SAME

[75] Inventors: Carl Kröger, Aachen; Ingo Romey; Georg Kölling, both of Essen, all of Fed. Rep. of Germany

[73] Assignee: Bergwerksverband GmbH, Essen, Fed. Rep. of Germany

[*] Notice: The portion of the term of this patent subsequent to Sep. 12, 1995, has been disclaimed.

[21] Appl. No.: 911,702

[22] Filed: Jun. 1, 1978

Related U.S. Application Data

[60] Division of Ser. No. 649,920, Jan. 16, 1976, Pat. No. 4,113,817, which is a continuation of Ser. No. 461,738, Apr. 7, 1974, abandoned, which is a continuation-in-part of Ser. No. 238,519, Mar. 27, 1972, abandoned.

[30] Foreign Application Priority Data

Apr. 3, 1971 [DE] Fed. Rep. of Germany ....... 2116417
May 18, 1971 [DE] Fed. Rep. of Germany ....... 2124555

[51] Int. Cl.$^2$ ............................................. C08L 7/00
[52] U.S. Cl. ............................... 264/120; 260/42.25; 264/105; 264/122; 264/330; 264/331
[58] Field of Search ............... 264/120, 105, 122, 330, 264/331; 260/42.25, 42.46, 3

[56] References Cited

U.S. PATENT DOCUMENTS 3,400,096  9/1968  Bateman et al. ................. 260/42.25
3,915,906  10/1975  Romey ............................ 260/42.25

Primary Examiner—Jeffery R. Thurlow
Attorney, Agent, or Firm—Michael J. Striker

[57] ABSTRACT

Coal-containing shaped bodies are made by intimately mixing particulate coal with 10 to 30 percent by weight of a polymer. The mixture is shaped by subjecting it to a pressure between about 295 and 3430 newtons per square centimeter. Shaping takes place within a temperature range of 100° to 250° C. The shaped bodies have high compressive and bending strengths and can be precisely dimensioned.

17 Claims, No Drawings

COAL-CONTAINING SHAPED BODIES AND PROCESS FOR MAKING THE SAME

The present application is a division of application Ser. No. 649,920, filed Jan. 16, 1976, now U.S. Pat. No. 4,113,817. This divisional application in turn was a continuation of application Ser. No. 461,738 filed Apr. 7, 1974, now abandoned. The latter application was a continuation-in-part of application Ser. No. 238,519, filed Mar. 27, 1972.

BACKGROUND OF THE INVENTION

The invention relates generally to shaped bodies such as slabs, sheets, profiles, tubes, pipes, foils and the like, as well as to a process for making shaped bodies. More particularly, the invention relates to coal-containing shaped bodies and a process of making the same.

The possibility of employing coal in the manner of plastics in order to make various articles has been discussed with reference to lignite in a publication by F. Fisher, O. Horn and H. Kuster found in "Brennstoff-Chemie", volume 15, page 327 (1934). On the other hand, from a publication by C. Kröger and G. Brinkmann in "Brennstoff-Chemie", volume 48, number 6, pages 173-184 (1967) and number 7, pages 198-206, it is made clear that the binding power of pure coal is too low for obtaining useful shaped bodies, even if pressure and high temperatures are employed in the shaping operation. Thus, after cooling, the shaped bodies do not possess adequate bending strength. For instance, although a maximum compressive strength of 5885 to 7845 newtons per square centimeter (600 to 800 kp per square centimeter) is obtainable when using coal having a volatile components content of 32%, the bending strength, on the contrary, is extremely low. Moreover, when using pure coal, a considerable change in the dimensions of the shaped bodies occurs during cooling.

SUMMARY OF THE INVENTION

Accordingly, it is a general object of the invention to provide coal-containing shaped bodies which are superior to those known heretofore, as well as a process for making such coal-containing shaped bodies.

Another object of the invention is to provide coal-containing shaped bodies which possess both high compressive strength and high bending strength, as well as a process for making such coal-containing shaped bodies.

A further object of the invention is to provide coal-containing shaped bodies which may be made to precise dimensions, as well as a process for making such coal-containing shaped bodies.

An additional object of the invention is to provide coal-containing shaped bodies possessing high hardness, as well as a process for making such coal-containing shaped bodies.

In pursuance of these objects, and of others which will become apparent hereinafter, the invention provides a process for making coal-containing shaped bodies wherein a mixture, which includes coal and substantially 10 to 30 percent by weight of a polymer, is formed. Advantageously, the coal comprises particles having a particle size of less than about 200 microns. This mixture is shaped under pressure and preferably at a temperature within the range of substantially 100° to 250° C.

DESCRIPTION OF THE PREFERRED EMBODIMENTS

Unless otherwise indicated, all percentages by weight given herein will be assumed to be based on the total mixture.

In accordance with the invention, shaping or pressing of the mixture may be carried out in any type of conventional molding apparatus, for instance, punch dies, drop forges, extrusion presses, injection molds, etc. The shaping of the mixture in these types of apparatus may be effected at relatively low temperatures, for example, between about 100° and 250° C. The pressure applied during the shaping operation is preferably between about 294 and 3432 newtons per square centimeter (30 to 350 kp per square centimeter). It is advantageous when the applied pressure is released for short periods or momentarily during the shaping operation in order to permit the unimpeded escape of any released gases or volatile components. For instance, it is possible to complete the shaping operation within a period of about 6 minutes and, in such an event, it is advantageous when the pressure is released for a few seconds every two minutes or so. When the shaping operation is carried out by releasing the pressure periodically, it is preferable when the pressure applied after the release is the same as or greater than the pressure applied prior to the release.

According to the invention, any type of coal may be used for making the shaped bodies, that is, spanning the spectrum from lignite or soft coal to hard coal. Advantageously, however, although not necessarily, the coal used has a relatively high volatile components content. The volatile components content is determined in conventional manner by holding the coal at a temperature of 900° C. for a period of 7 minutes and measuring the gases generated excluding $H_2O$. It is preferable when the volatile components content of the coal is at least about 5 percent, an example of a coal which may have a volatile components content of about 5 percent being anthracite. The coal is preferably used in particulate form, that is, it is preferable to grind or comminute the coal prior to mixing it with the polymer. The particle size of the coal is then advantageously less than about 200 microns and, under certain circumstances, it is of particular advantage for the particle size of the coal to be below about 100 microns.

For the purposes of the invention, the term polymer as used herein may be considered as embracing two groups of materials, namely, elastomers and other thermoplastic polymers or, more simply, elastomers and thermoplastics.

The elastomers which may be used in accordance with the invention include natural rubber, polyisoprene, polychloroprene (neoprene), polybutadiene and copolymers of these substances, for example, butadiene acrylonitrile copolymer and butadiene styrene copolymer. The elastomer should be distributed as homogeneously as possible throughout the coal.

The elastomer may be employed in several forms. For instance, the elastomer may be in pulverulent or particulate form and the operation of mixing it with the coal may then take place at room temperature. If the elastomer is used in particulate form, it is of advantage here also when the elastomer particles have a particle size of less than about 200 microns since this will be of help in obtaining a homogeneous distribution of the elastomer throughout the coal, especially when the latter is finely ground. It is further possible for the elastomer to be in solution, that is, in dissolved form, or for the elastomer to be in emulsified form. The latter is particularly suitable for all natural and synthetic elastomers which are available in the form of a rubber latex. Where the elastomer is in dissolved or emulsified form, all or a major part of the solvent or the emulsifying agent for the elastomer, which may be water, is advantageously removed from the mixture by heating prior to the shaping step and, in such an event, the heating is preferably performed during the mixing operation.

The thermoplastics which may be used in accordance with the invention include the polyamides such as nylon, Perlon, polyethylene, polypropylene, polyvinylchloride, polytetrafluorethylene, polyurethane, polystyrene, polyacrylonitrile and copolymers of these substances. Similarly to the elastomers, the thermoplastics may be employed in several forms. Thus, the thermoplastic may be in pulverulent or particulate form and in this case it is again advantageous for the thermoplastic particles to be of a particle size less than about 200 microns. It is also possible for the thermoplastic to be in solution, that is, in dissolved form, or for the thermoplastic to be in emulsified form. Here, it is likewise of advantage to remove all or a major part of the solvent or emulsifying agent for the thermoplastic, which may be water, by heating prior to the shaping operation. Preferably, such heating is effected during the mixing operation.

Further processing of the mixture may, in many instances, be improved by adding thereto about 0.5 to 3 percent by weight of sulfur. Such low sulfur additions are, in addition, able to increase the strength of the shaped bodies.

The shaping of the initial mixture under pressure may also be improved by adding plasticizers thereto. Such plasticizers may be added in amounts between about 2 and 7 percent by weight and, advantageously, in amounts between about 4 and 5 percent by weight. Examples of plasticizers which may be used are dinonylphthalate, dibutylphthalate, dioctylphthalate, dimethylglycolphthalate, dibutylglycolphthalate, dicyclohexylphthalate, benzylbutylphthalate, adipic acid benzyloctylester, trimellitic acid tributylester, trimellitic acid trioctylester, pyromellitic acid tetrabutylester and pyromellitic acid tetraoctylester.

The bending strength of the shaped bodies may be substantially increased by adding to the initial mixture, prior to the shaping operation, between about 5 and 40 percent by weight of inert fibrous materials. Such materials include asbestos, mineral wool, glass wool or glass fibers and carbon or carbonaceous fibers. Mixtures including these additives may also be processed in presses such as power presses, in extrusion apparatus, in injection molds and the like in the same manner as pure thermoplastic materials.

A partial summary, including different components and compositions, as well as properties, is set forth in the accompanying

TABLE

| No. | Volatile Components (percent) | Elastomer (percent by weight) | Thermoplastic (percent by weight) | Sulfur (percent by weight) | Fiber Material Relative to Coal-Polymer Mixture (percent by weight) | Bending (newtons per square centimers) | Strength (kp per square centimeter) |
|---|---|---|---|---|---|---|---|
| 1 | 38 | 15 BAM*++ | — | 0.5 | — | 1961 | 200 |
| 2 | 38 | 10 BAM | 5 PVC+ | — | — | 2059 | 210 |
| 3 | 38 | 12 BAM | 4 polyethylene | 2 | 20 asbestos | 3825 | 390 |
| 4 | 38 | 9 BAM | 4 PVC | 2 | 10 glass | 2354 | 240 |
| 5 | 25 | 20 BSM** | — | — | — | 1765 | 180 |
| 6 | 25 | 15 BSM++ | 5 polypropylene | — | — | 2059 | 210 |
| 7 | 25 | 14 BSM | 5 polypropylene | 1 | — | 2157 | 220 |
| 8 | 25 | 14 BSM | 5 polypropylene | 1 | 15 mineral wool | 2648 | 270 |
| 9 | 18 | 25 neoprene*** | 5 polyethylene | — | — | 2059 | 210 |
| 10 | 18 | 22 neoprene+ | 5 polyethylene | 3 | — | 2157 | 220 |
| 11 | 18 | 22 neoprene+ | 5 polyethylene | — | 35 nylon | 3236 | 330 |
| 12 | 6 | 20 natural rubber | 7 polyamide (nylon powder) | — | — | 1667 | 170 |
| 13 | 6 | 20 natural rubber | 7 polyamide (nylon powder) | — | 5 cotton | 2255 | 230 |
| 14 | 42 | 10 polyisoprene | 6 Perlon | — | — | 2157 | 220 |
| 15 | 42 | 10 polyisoprene+ | 6 Perlon | 1 | — | 2255 | 230 |
| 16 | 42 | 10 polyisoprene++ | 6 Perlon | 1 | 5 asbestos | 2844 | 290 |

*butadiene acrylonitrile copolymer
**butadiene styrene copolymer
***synthetic elastomer-Dupont
+ dissolved in solvent
++ suspension According to one embodiment of the invention, the mixture to be shaped comprises coal and about 10 to 30 percent by weight of an elastomer. Here, the strength of the shaped bodies may often be improved by replacing approximately 1 to 10 percent by weight of the elastomer by such a quantity of a thermoplastic. Thus, the elastomers and the copolymers thereof may be used in mixture with polystyrene and polyacrylonitrile, for example. In connection with this embodiment of the invention, it should be mentioned that shaped bodies made using copolymers of butadiene and acrylonitrile exhibit particularly favorable properties in that they are not only of high strength but simultaneously possess good elasticity not obtainable with other polymers.

The embodiment of the invention presently under discussion is further illustrated by the following Examples which, however, are not to be construed as limiting the invention in any manner:

EXAMPLE 1

80 parts by weight of an open burning coal, having a volatile components content of 38.7 percent, is ground to a particle size of less than 100 microns. The thus-ground coal is then mixed with 20 parts by weight of butadiene acrylonitrile copolymer contained in a water emulsion and with 2 parts by weight of sulfur. Mixing is effected at room temperature and until a homogeneous mixture is obtained. 400 grams of the mixture is placed in a hand press which has been preheated to a temperature of 210° C. and, within a period of 6 minutes, shaped according to the following schedule:

(a) first and second minutes: pressure of 1471 newtons per square centimeter (150 kp per square centimeter), subsequent ventilation for about 5 to 10 seconds;

(b) third and fourth minutes: pressure of 2942 newtons per square centimeter (300 kp per square centimeter), subsequent ventilation for about 5 to 10 seconds;

(c) fifth and sixth minutes: pressure of 2942 newtons per square centimeter (300 kp per square centimeter), subsequently expelling the shaped body from the hot pressure apparatus at 210° C. In this manner, sheets having dimensions of about 200 millimeters by 200 millimeters by 8 millimeters are obtained. The sheets exhibit the following mechanical, thermal and electrical properties:

Compressive Strength: 9807 newtons per square centimeter (1000 kp per square centimeter)
Bending Strength: 2452 newtons per square centimeter (250 kp per square centimeter)
Modulus of Elasticity: 98,066 to 147,100 newtons per square centimeter (10,000 to 15,000 kp per square centimeter)
Shore Hardness: 90 to 95
Apparent Density: 1.3 grams per cubic centimeter
Thermal Conductivity: 0.37 kilocalories per meter-hour-°C.
Direct Current Conductivity: $2 \cdot 10^{-14}$ (ohm-centimeters)$^{-1}$
Dielectric Constant (Real Part): 7.5 to 5.5 (at 800 to $10^6$ Hertz)
Power Factor (in percent): 0.07 to 0.06 (at 800 to $10^6$ Hertz)

EXAMPLE 2

70 parts by weight of a mineral coal having a volatile components content of 18 percent, is ground to a particle size of less than 80 microns. The thus-ground coal is then mixed with 20 parts by weight of particulate butadiene styrene copolymer and 7 parts by weight of polyethylene until a flowable mixture having an average particle size of about 1 millimeter is obtained. This mixture is placed in an extruder and plastified. The extruder is equipped with three-zone heating and the following temperatures are used in the different zones:

| first stage | (entry zone) | 120° C. |
| second stage | (intermediate region) | 150° C. |
| third stage | (nozzle region) | 120° C. |

Depending upon the type of nozzle used, endless round strands of the most diverse diameters or foils of different thickness may be obtained. When using a nozzle having a round aperture of 6 millimeter diameter, very flexible round strands having a tensile strength of 8.8 newtons per square centimeter (0.9 kp per square centimeter) and a compressive strength of 2942 newtons per square centimeter (300 kp per square centimeter) are obtained.

EXAMPLE 3

A mixture is formed which consists of 70 percent by weight of fat coal (25 percent volatile components content), 17.5 percent by weight of neoprene, 2.5 percent by weight of sulfur and 10 percent by weight of polyvinylchloride. This mixture, in form of a flowable mixture, for example, in powdered or granulated form, is introduced into an extruder equipped with four-zone heating and extruded. The various heating zones are set at the following temperatures:

| first zone | 160 to 190° C. |
| second zone | 180 to 210° C. |
| third zone | 150 to 170° C. |
| fourth zone | 100 to 120° C. |

Depending upon the form of the nozzle used, endless round strands, tubes or profiled bodies of any desired shape are obtained. The shaped bodies exhibit the following properties: bending strength, 1863 newtons per square centimeter (190 kp per square centimeter); compressive strength, 3432 newtons per square centimeter (350 kp per square centimeter).

EXAMPLE 4

A particulate open burning coal, having a volatile components content of 43 percent and a particle size between 10 and 90 microns, is intimately mixed with 15 percent by weight of butadiene and styrene copolymer, 5 percent by weight of polyethylene and 2 percent by weight of sulfur. The average particle size of the resulting mixture is between 100 and 150 microns. This mixture is then mixed with 20 percent by weight of glass fibers for approximately 5 to 10 minutes and pressed to the form of sheets in a hand press at a temperature of 230° C. After cooling, the sheets exhibited a compressive strength of 9316 newtons per square centimeter (950 kp per square centimeter) and a bending strength of 2844 newtons per square centimeter (290 kp per square centimeter).

EXAMPLE 5

65 parts by weight of a crude lignite mined in the Rhine district of Germany is ground to a particle size of less than 100 microns. The thus-ground lignite and 20 parts by weight of butadiene acrylonitrile copolymer ("Perbunan N"), 10 percent polyvinylchloride ("Hostalit") and 5 percent of a plasticizer such as, for example, phthalic acid butylester or Palatinol AH (trademark), are then kneaded at an elevated temperature until a homogeneous mixture is obtained. Subsequently, the mixture is processed in an extruder to form semi-finished products such as rods, tubes, profiles, etc. The extruder is equipped with three-zone heating and the working temperatures in the various zones are set as follows:

| first stage | (entry zone) | 90 to 110° C. |
| second stage | (intermediate region) | 120 to 160° C. |
| third stage | (nozzle region) | 70 to 110° C. |

The extruded shaped bodies clearly exhibit a thermoplastic behavior, that is, they may be shaped and processed as often as desired. Of course, the material is also capable of being injection molded. The extruded material is elastic and readily shaped. It may be welded and mechanically processed, that is, sawed, milled, drilled, etc., and it possesses a tensile strength of the order of 9.8 newtons per square centimeter (1.0 kp per square centimeter).

According to another concept of the invention, the mixture to be shaped comprises coal and 10 to 30 percent by weight of a thermoplastic. Here, it is of advantage under certain circumstances when part of the thermoplastic is replaced with an elastomer. Thus, in accordance with this embodiment of the invention, up to approximately one-half by weight of the thermoplastic may be substituted by an elastomer, that is, the polymer content of the mixture may comprise from zero to fifty percent of an elastomer.

The following Examples, which are not intended to limit the invention in any manner, illustrate this embodiment of the invention:

EXAMPLE 6

85 percent by weight of an open burning coal, having a volatile components content of 38.7 percent, is ground to a particle size of less than 100 microns. The thus-ground coal is homogeneously mixed with 7.5 percent by weight of polyethylene in particulate form and 7.5 percent by weight of butadiene acrylonitrile copolymer contained in a water suspension. After comminution to a flowable product, the mixture is placed in a hydraulic hand press preheated to a temperature of 210° C. and pressed to the form of sheets according to the following schedule:

(a) first and second minutes: pressure of 980 newtons per square centimeter (100 kg per square centimeter), subsequent release of pressure for about 5 to 10 seconds;

(b) third and fourth minutes: pressure of 1960 newtons per square centimeter (200 kg per square centimeter), subsequent release of pressure for about 5 to 10 seconds;

(c) fifth and sixth minutes: pressure of 1960 newtons per square centimeter (200 kg per square centimeter) and subsequent ejection of the shaped bodies from the molding apparatus.

The thus-obtained sheets exhibit the following mechanical, thermal and electrical properties:

Compressive Strength: 2470 newtons per square centimeter (252 kg per square centimeter)
Bending Strength: 1235 newtons per square centimeter (125 kg per square centimeter)
Impact toughness: 12.5 newton-centimeter per square centimeter (1.25 kg-centimeter per square centimeter)
Notched Impact Resistance: 9.8 newton-centimeter per square centimeter (1.0 kg-centimeter per square centimeter)
Modulus of Elasticity: 117,600 newtons per square centimeter (12,000 kg per square centimeter)
Apparent Density: 1.3 grams per cubic centimeter
Thermal Conductivity: 0.37 kilocalories per meter-hour-°C.
Direct Current Conductivity: $2 \cdot 10^{-14}$ (ohm-centimeters)$^{-1}$
Dielectric Constant: 7.5 to 5.5 (at 800 to $10^6$ Hertz)

EXAMPLE 7

A mixture, consisting of 70 percent by weight of particulate anthracite coal having a particle size of less than 35 microns, 20 percent by weight of low-pressure polyethylene and 10 percent by weight of butadiene styrene copolymer, is kneaded in an internal mixer at 150° C. to form a homogeneous mixture and granulated. The granulate is admitted into an extruder and extruded to the form of tubes or sheets. The extruder is equipped with three-zone heating and the heating zones in the extruder are set as follows:

| first stage | (entry zone) | 130 to 140° C. |
|---|---|---|
| second stage | (intermediate region) | 180 to 190° C. |
| third stage | (nozzle region) | 120 to 130° C. |

Shaped bodies produced in this manner exhibit the following mechanical properties: impact toughness, 92.5 newton-centimeter per square centimeter (9.44 kg-centimeter per square centimeter); bending strength, 3473 newtons per square centimeter (354.4 kg per square centimeter).

EXAMPLE 8

75 percent by weight of a fat coal, having a volatile components content of about 24 percent, is ground to a particle size of less than 100 microns. The thus-ground coal and 15 percent by weight of polyvinylchloride, 5 percent by weight of butadiene styrene copolymer and 5 percent by weight of wax or paraffin are intensively kneaded at a temperature of 150° C. and subsequently granulated. The so-pretreated mixture is then either processed in a hand press, as described in Example 6, to form sheets or is processed in an extruder, as described in Example 7, to form tubes, profiles or sheets. Shaped bodies made of this material possess the following mechanical properties: compressive strength, 2842 newtons per square centimeter (290 kg per square centimeter); bending strength, 1352 newtons per square centimeter (138 kg per square centimeter); impact toughness, 27.4 newton-centimeter per square centimeter (2.8 kg-centimeter per square centimeter).

EXAMPLE 9

70 percent by weight of particulate lignite having a particle size of less than 100 microns, 15 percent by weight of butadiene styrene copolymer, 10 percent by weight of high-pressure polyethylene and 5 percent by weight of bitumen B 80 are kneaded in an intensive mixer at a temperature of 150° C. and subsequently granulated. The granulate is either further processed in an injection molding apparatus to form shaped bodies or is further processed in an extruder to form foils. The injection molding apparatus and extruder are equipped with three-zone heating and the processing temperatures in the various zones are set as follows:

| first stage | (entry zone) | 110 to 120° C. |
|---|---|---|
| second stage | (intermediate region) | 150 to 170° C. |
| third stage | (nozzle region) | 110 to 130° C. |

For a mixture processed so as to form a foil having a thickness of 1.5 millimeters, the following mechanical properties are obtained: tensile strength, 252.8 newtons per square centimeter (25.8 kg per square centimeter); crack propagation resistance, 198.9 newtons per square centimeter (20.3 kg per square centimeter); elongation at fracture, 380 percent.

EXAMPLE 10

70 percent by weight of a particulate lean coal having a particle size of less than 100 microns, 20 percent by weight of low-pressure polyethylene and 10 percent by weight of high-pressure polyethylene are kneaded intensively for 15 minutes at a temperature of 150° C. and subsequently worked up in a mill so as to form a flowable product. The mixture is pressed in a hot hand press and at a temperature of 190° C. in accordance with the procedure described in Example 6. In this manner, sheets are formed which exhibit the following mechanical properties:

Compressive Strength: 1183 newtons per square centimeter (120.7 kg per square centimeter)
Bending Strength: 3998 newtons per square centimeter (408 kg per square centimeter)
Tensile Strength: 1480 newtons per square centimeter (151 kg per square centimeter)
Elongation at Fracture: less than 5 percent
Impact Toughness: 47.5 newton-centimeter per square centimeter (4.85 kg-centimeter per square centimeter)

By proceeding in accordance with the invention, shaped bodies of high hardness may be obtained. In fact, the hardness of the shaped bodies according to the invention may approach that of rock or ceramic materials. Shaped bodies made in accordance with the invention may possess hardnesses of 60 and more on the Shore scale.

It will be understood that each of the elements described above, or two or more together, may also find a useful application in other types of processes and articles differing from the type described above.

While the invention has been illustrated and described as embodied in coal-containing shaped bodies and a process for making the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features which, from the standpoint of prior art, fairly constitute essential characteristics of the generic or specific aspects of this invention and, therefore, such adaptations should and are intended to be comprehended within the meaning and range of equivalence of the following claims.

What is claimed and new and desired to be protected by Letters Patent is set forth in the appended claims:

1. A process for making shaped bodies by extrusion or injection molding, the bodies having the form of slabs, sheets, profiles, tubes, pipes or foils,
the said process comprising forming a mixture between (a) coal particles having a size of at most 200 microns and (b) about 10 to 30% by weight of thermoplastic polymer and copolymer,
and pressure-shaping said mixture by extrusion or injection molding to its final form at a temperature of about 100° to 250° C.

2. A process as defined in claim 1 wherein said thermoplastic polymer is a member of the group consisting of polyethylene, polypropylene, polyvinylchloride, polytetrafluoroethylene, polyurethane, polystyrene, polyacrylonitrile, polyamide and thermoplastic copolymers of said members.

3. A process as defined in claim 1 wherein said mixture includes substantially 0.5 to 3% by weight of sulfur to increase the strength of the product.

4. A process as defined in claim 1 wherein said mixture consists of 70% by weight of a lean coal having a particle size of less than 100 microns, 20% by weight of low-pressure polyethylene and 10% by weight of high-pressure polyethylene.

5. A process as defined in claim 1, wherein said polymer or polymers comprises particles or a particle size less than substantially 200 microns.

6. A process as defined in claim 1, wherein said polymer is in form of a solution of an emulsion; and further comprising the step of heating said mixture prior to the shaping step so as to drive off the solvent or emulsifying agent.

7. A process as defined in claim 1, wherein said mixture includes substantially 5 to 40 percent by weight of an inert fibrous material.

8. A process as defined in claim 7, wherein said fibrous material comprises at least one substance selected from the group consisting of asbestos, glass fibers and carbonaceous fibers.

9. A process as defined in claim 1, wherein said mixture includes substantially 2 to 7 percent by weight of a plasticizer.

10. A process as defined in claim 9, wherein said mixture includes substantially 4 to 5 percent by weight of said plasticizer.

11. A process as defined in claim 1, wherein said pressure is between substantially 294 and 3432 newtons per square centimeter.

12. A process as defined in claim 1, wherein said coal has a high volatile components content.

13. A process as defined in claim 1, wherein said particle size of the coal is less than substantially 100 microns.

14. A process as defined in claim 1, wherein the shaping step comprises subjecting said mixture to an initial pressure; releasing the pressure so as to permit the escape of volatile components; and subsequently increasing the pressure to at least said initial pressure.

15. A process as defined in claim 14, wherein the pressure is released more than once so as to permit the escape of volatile components; and wherein after each such release the pressure is increased to at least the same pressure as immediately preceding the respective release.

16. A process as defined in claim 14, wherein the pressure is released for a period of about 5 to 10 seconds.

17. A process as defined in claim 15, wherein the shaping step is effected within substantially 6 minutes; and wherein the pressure is released at approximately 2 minutes intervals.

* * * * *